Figure 1:
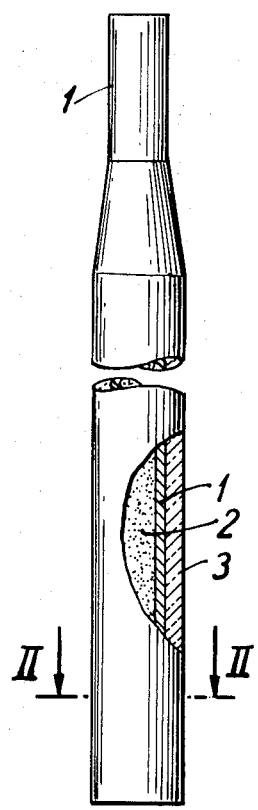

United States Patent

[11] 3,559,864

[72] Inventor Lars Hilding Hillert
 Goteborg, Sweden
[21] Appl. No 715,924
[22] Filed Mar. 25, 1968
 Division of Ser. No. 485,594, Sept. 7, 1965,
 Patent No. 3,452,419.
[45] Patented Feb. 2, 1971
[73] Assignee Elektriska Svetsningsaktiebolaget
 Goteborg, Sweden
 a corporation of Sweden

[54] WELDING WIRE OR WELDING ROD
 2 Claims, 2 Drawing Figs.
[52] U.S. Cl. ................................................. 228/56,
 29/504, 117/202; 148/26, 219/146
[51] Int. Cl. ................................................. B23k 3/06,
 B23k 35/14
[50] Field of Search.......................................... 228/56;
 219/146, 145; 117/202; 148/26; 161/225; 29/504

[56] References Cited
UNITED STATES PATENTS

| | | | |
|---|---|---|---|
| 2,720,473 | 10/1955 | Donahey | 219/146 |
| 3,424,892 | 1/1969 | Wilcox | 117/202 |
| 1,629,748 | 5/1927 | Stoody | 219/146 |
| 2,697,159 | 12/1954 | Donahey | 148/26X |
| 3,073,948 | 1/1963 | Johnson | 219/145X |
| 3,278,815 | 10/1966 | Booe et al. | 317/258 |
| 3,334,975 | 8/1967 | Quaas et al. | 29/191.6 |

Primary Examiner—John F. Campbell
Assistant Examiner—Robert J. Craig
Attorney—Eugene J. Kalil ABSTRACT: A welding wire or welding rod comprising a metallic sheath composed of grains or granules of inorganic welding materials embedded in and bonded by a solidified matrix consisting of an inorganic anhydrous compound selected from the group comprising chromium oxides and boric oxide.

PATENTED FEB 2 1971 3,559,864

INVENTOR.
LARS HILDING HILLERT
BY
Eugene J Kalil
ATTORNEY

WELDING WIRE OR WELDING ROD

This is a division of my copending Pat. application for "Method of Making a Tubular Welding Wire or Welding Rod Enclosing a Core Composed of Powdered Components," Ser. No. 485,594 filed Sept. 7, 1965, now U.S. Pat. No. 3,452,419, granted Jul. 1, 1969.

This invention relates to consumable welding rods or welding electrodes. More particularly, the invention relates to welding rods or welding electrodes of the type comprising a tubular metallic sheath enclosing a core or filling composed of grains or granules of inorganic welding materials belonging to one or more of the following groups: Alloying agents, fluxing agents, slag-forming agents, gas-forming agents and arc-stabilizing or electron-emitting agents.

Tubular welding wire or rods of the kind referred to are used in gas welding and in arc welding with nonconsumable electrode (carbon arc welding and TIG welding) as well as in the electroslag welding process (ES welding) and the consumable electrode welding process, in which last-mentioned processes the tubular wire or rod does itself constitute the consumable electrode. In automatic or semiautomatic consumable-electrode welding the wire is usually supplied as a coil, while in manual welding usually rod-shaped electrodes are employed. The wires or rods may be either bare or coated.

With the tubular wires or rods referred to, it is important to prevent material from dropping out at the electrode tip and to prevent voids from forming within the electrode. To secure this result it has been suggested to submit the core material to a high degree of compaction in the course of the manufacture, in order to convert it into a virtually solid body. This method does, however, not always secure the desired result. Also, it imposes particular restrictions on the manufacturing process. It has also been suggested to mix the powered material with a liquid bonding agent, for instance a sodium silicate solution, to a paste and to deposit or extrude a string of said paste in the trough-shaped strip. This method introduces, however, other complications.

According to a principal feature of the present invention, the grains or granules of inorganic materials making up the core of the welding wire or welding rod are embedded in and bonded by a solidified matrix consisting of an inorganic anhydrous compound selected from the group comprising chromium oxides and boric oxide. Said matrix forms a very efficient bond between the individual grains or granules as well as between the core and the sheath and thus effectively prevents core material from dropping out of the sheath during transport or handling. Compared to the known use of sodium silicate solution as a binder, the matrix materials from the groups above specified have the particular advantage that they do not require the extended baking period which is necessary to remove the water from the sodium silicate, and also the advantage that they introduce no silicon into the electrode.

The proportion of matrix material required in the welding wire or welding rod to some extent depends upon the grain sizes of the powdered solid constituents of the core composition and other factors. Generally, the proportion of matrix material should not be lower than 1 percent and not exceed 10 percent of the weight of the core composition. A proportion of about 5 percent will be suitable in the majority of cases.

Figure 2:
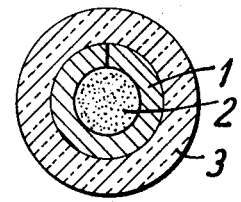

In the accompanying drawing illustrating the invention:

FIG. 1 is a side view of one form of a coated electrode embodying the invention; and FIG. 2 is a cross-sectional view taken along II–II on a larger scale.

The electrode comprises a tubular sheath 1 of mild steel (0.1 percent of carbon), a filling 2 enclosed by said sheath, and a flux coating 3 enclosing the sheath. The filling 2 consists of:

|  | Percent |
| --- | --- |
| Chromium powder | 65 |
| Nickel powder | 32 |
| Chromium trioxide | 3 |
|  | 100 |

The chromium trioxide is present in the form of a solidified matrix forming a bond between the chromium and nickel particles. The weight of the filling is equal to 43 percent of the weight of the steel sheath, or 30 percent of the combined weight of the steel strip and the filling. The flux coating 3 may be of any of the types customarily employed for electrodes of austenitic stainless steel, for instance the inorganic titania base type containing about 30 percent of titania. The electrode deposits a weld metal consisting of austenitic stainless steels. The electrode has a current carrying capacity far exceeding the one of electrodes having a massive core wire of stainless steel, but behave otherwise in the same way as the usual electrodes.

The electrodes are preferably manufactured in the following way. A strip of mild steel (0.1 percent of carbon) having a width of 21 mm. and a thickness of 1.2 mm. is continuously shaped into a trough having a rounded bottom by means of a set of profiling rollers and subsequently shaped into a cylindrical tube by means of a set of rollers which bend the edges of the strip inwards to an abutting position. Prior to the closing of the trough the following powdered, dry composition is deposited in the trough:

|  | Percent |
| --- | --- |
| Chromium powder | 65 |
| Nickel powder | 32 |
| Chromium trioxide powder | 3 |
|  | 100 |

The grain sizes of the powder are distributed within the range of 0.08 to 0.4 mm. The ratio of the weight of the powder to the weight of the steel strip is adjusted to the proportion above specified. The tube is then reduced to a diameter of 5 mm. by cold drawing and wound into coils. The coils are heated to 220° C. in a furnace and held 30 minutes at said temperature. After cooling, the tubular wire is straightened by means of a set of straightening rollers and supplied to a wire cutting machine of the type normally used for cutting massive wire, by which the wire is cut into rods having a length of 450 mm. The rods are fed into an electrode press in which they are provided with an extruded coating of the kind above specified. The coated electrode is then dried in the usual way.

I claim:

1. A welding wire or welding rod comprising a metallic sheath enclosing a core composed of grains or granules of inorganic welding materials embedded in and bonded by a solidified matrix consisting of an inorganic anhydrous compound selected from the group consisting of chromium oxides and boric oxide.

2. A welding wire or welding rod comprising a metallic sheath, a core in said sheath composed of grains or granules of inorganic welding materials embedded in and bonded by a solidified matrix consisting of an inorganic anhydrous compound selected from the group consisting of chromium oxides and boric oxide, and a flux coating surrounding said metallic sheath.